US011494864B2

(12) United States Patent
Bostick et al.

(10) Patent No.: US 11,494,864 B2
(45) Date of Patent: Nov. 8, 2022

(54) SECURING PHYSICAL ENVIRONMENTS THROUGH COMBINATORIAL ANALYTICS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 980 days.

(21) Appl. No.: 15/182,537

(22) Filed: Jun. 14, 2016

(65) Prior Publication Data

US 2017/0357695 A1  Dec. 14, 2017

(51) Int. Cl.
*G06Q 50/26* (2012.01)
*G06Q 10/00* (2012.01)
(Continued)

(52) U.S. Cl.
CPC ........... *G06Q 50/265* (2013.01); *G06Q 10/00* (2013.01); *G06Q 10/02* (2013.01);
(Continued)

(58) Field of Classification Search
None
See application file for complete search history.

(56) References Cited

U.S. PATENT DOCUMENTS 5,915,268 A * 6/1999 Linker ............... G01N 1/24
                                                    422/93
6,334,365 B1 * 1/2002 Linker ............... G01N 1/2214
                                                    73/864.71
(Continued)

FOREIGN PATENT DOCUMENTS

EP     002390845 A2   11/2011
EP     002676417 A2   12/2013
WO     2011030533 A2   3/2011

OTHER PUBLICATIONS

Ramasastry, Anita. "Lost in Translation-Data Mining, National Security and the Adverse Inference Problem." Santa Clara Computer & High Tech. LJ 22 (2005): 757.
(Continued)

*Primary Examiner* — Thu N Nguyen
(74) *Attorney, Agent, or Firm* — Garg Law Firm, PLLC; Rakesh Garg; Randy Tejeda

(57) ABSTRACT

For securing a physical environment, an intersection determination is performed using a first record of a first person and a second record of a second person, to determine whether a travel plan of the first person and a travel plan of the second person intersect at a location and a time. When the intersection determination is affirmative, an analysis is performed whether a first object associated with the first person and a second object associated with the second person are combinable to form a combined object having a combined property. When the combined property is designated as harmful in the physical environment, a suspicion indication is outputted. The suspicion indication includes an identity of the first person, an identity of the second person, and a level of suspicion.

19 Claims, 5 Drawing Sheets

(51) Int. Cl.
*G06Q 10/02* (2012.01)
*G06Q 10/06* (2012.01)
*G06Q 90/00* (2006.01)
*H04L 67/50* (2022.01)

(52) U.S. Cl.
CPC ....... *G06Q 10/06311* (2013.01); *G06Q 90/20* (2013.01); *H04L 67/535* (2022.05)

(56) References Cited

U.S. PATENT DOCUMENTS

| | | | |
|---|---|---|---|
| 7,694,150 B1* | 4/2010 | Kirby | G06F 21/56 713/188 |
| 8,856,869 B1 | 10/2014 | Brinskelle | |
| 2004/0220753 A1* | 11/2004 | Tabe | G01N 33/0057 702/32 |
| 2004/0240542 A1* | 12/2004 | Yeredor | G06K 9/00771 375/240.01 |
| 2005/0248450 A1 | 11/2005 | Zanovitch | |
| 2009/0248807 A1* | 10/2009 | Fron | G06Q 10/00 709/206 |
| 2014/0201126 A1 | 7/2014 | Zadeh et al. | |
| 2014/0370816 A1 | 12/2014 | Bobrow | |
| 2015/0319256 A1* | 11/2015 | Casey | G06Q 50/01 709/204 |
| 2017/0154212 A1* | 6/2017 | Feris | G06K 9/00369 |

OTHER PUBLICATIONS

Malley, Pat O. "Risks, ethics, and airport security." Canadian Journal of Criminology and Criminal Justice/La Revue canadienne de criminologie et de justice pénale 48, No. 3 (2006): 413-421.
Price et al; "Practical Aviation Security", Butterworth—Heinemann, Dec. 31, 2012, Social Science—520 pages.
Wikipedia; "Predictive profiling", Mar. 2015.
FlightView; "Real Time Flight Tracker & Airport Delays from FlightView", Jul. 2015.
Gellman et al; "NSA tracking cellphone locations worldwide, Snowden documents show", The Washington Post, Dec. 2013.

* cited by examiner

SECURING PHYSICAL ENVIRONMENTS THROUGH COMBINATORIAL ANALYTICS

TECHNICAL FIELD

The present invention relates generally to a method, system, and computer program product for securing a physical space. More particularly, the present invention relates to a method, system, and computer program product for securing physical environments through combinatorial analytics.

BACKGROUND

Within the scope of the illustrative embodiments, a physical environment (or simply, "environment") is a physical space comprising one or more contiguous or disconnected locations. A network of airports, different areas in or around a stadium, a cruise ship, a port, a port with one or more ships, a railway station, and a train are some non-limiting examples of physical environments contemplated within the scope of the illustrative embodiments.

SUMMARY

The illustrative embodiments provide a method, system, and computer program product for securing physical environments through combinatorial analytics. An embodiment includes a method for securing a physical environment. The embodiment performs an intersection determination using a first record of a first person and a second record of a second person, to determine whether a travel plan of the first person and a travel plan of the second person intersect at a location and a time. The embodiment analyzes, responsive to the intersection determination being affirmative, whether a first object associated with the first person and a second object associated with the second person are combinable to form a combined object having a combined property. The embodiment outputs, responsive to the combined property being designated as harmful in the physical environment, a suspicion indication wherein the suspicion indication includes an identity of the first person, an identity of the second person, and a level of suspicion.

Another embodiment includes a computer program product for securing a physical environment, the computer program product comprising one or more computer-readable storage devices, and program instructions stored on at least one of the one or more storage devices.

Another embodiment includes a computer system for securing a physical environment, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
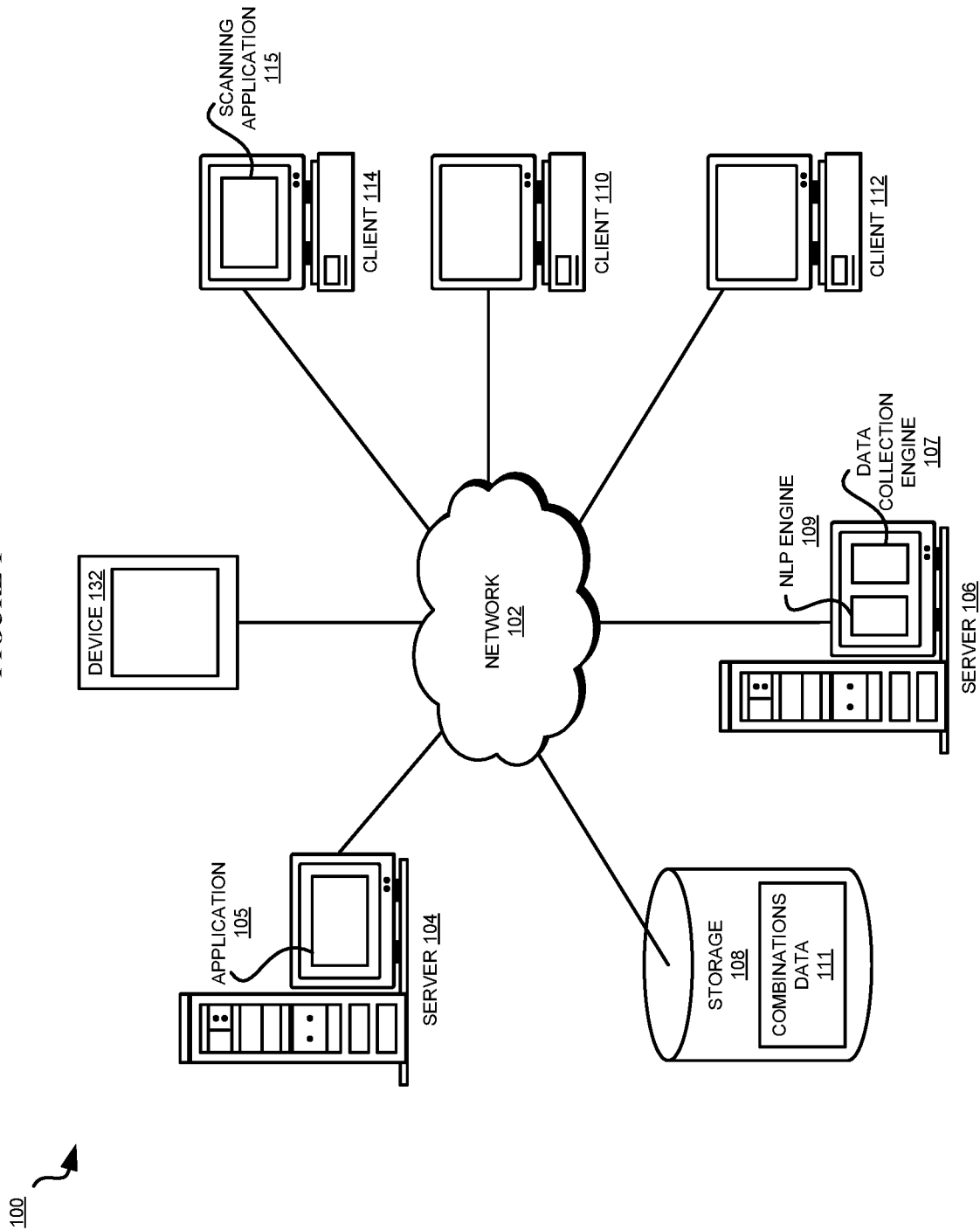
FIG. 1 depicts a block diagram of a network of data processing systems in which illustrative embodiments may be implemented.

The illustrative embodiments recognize that while some object can be detected and identified as potentially hazardous in an environment, not all hazardous objects can be readily detected or identified as such. For example, a chemical, even if detected in a traveler's possession, may be harmless on its own, but when combined with something else can become harmful in the airport environment.

The illustrative embodiments recognize that often a group of persons can collaborate to form a plan of action that may cause harm. The illustrative embodiments recognize that a possibility exists where the members of a group may have individually avoided detection or identification as harmful. The illustrative embodiments further recognize that a possibility exists that each member could carry an object—e.g., a benign chemical, substance, or agent—to a meeting location where other members bring similar objects. A hazardous object can then be combined at the meeting location, after passing the conventional check-points. In the presently available detection methods, such objects cannot be detected prior to their assembly.

The illustrative embodiments used to describe the invention generally address and solve the above-described problems and other problems related to securing physical environments. The illustrative embodiments provide a method, system, and computer program product for securing physical environments through combinatorial analytics.

An embodiment executes as an application in, or in conjunction with, a system for scanning persons and objects entering or present in a physical environment. For example, an embodiment can be implemented to operate with back-scatter x-ray equipment, passport control machines, check-in kiosks, baggage scanning x-ray machines, and other similarly purposed equipment used for identifying individuals and detecting objects.

An example physical environment comprising one or more airports is used to describe certain embodiments without implying any limitations of the illustrative embodiments thereto. From this disclosure, those of ordinary skill in the art will be able to adapt an embodiment to operate in a similar manner in other physical environments, such as stadia and other places where people or property are congregated, and such adaptations are contemplated within the scope of the illustrative embodiments.

For example, assume that in the example environment, one individual arrives at Los Angeles airport with one object, e.g., one benign substance. Another individual arrives at Seattle airport with another object, e.g., another benign substance. In this manner, several individual enter the environment at different locations with different objects such that neither an individual nor an object associated with the individual is identified as harmful when they enter the environment.

These individuals and their respective objects pass through security checkpoints at their respective origination locations without being identified as harmful. Further suppose that these individuals have travel itineraries that take them to a common destination location at a common time, or to different destinations through a common layover location at a common time. They arrive at the common location, combine their respective objects into a hazardous object, and use the hazardous object at the common location or transport it to another location in the environment and use it there.

This manner of operation circumvents the security measures that are presently used in various environments. A system or application implementing one or more of the illustrative embodiments is useful in detecting such methods of operation and identifying such individuals and their associated objects.

An embodiment receives information about a person from a presently used method of identifying an individual, such as an airline check-in kiosk or a passport or credit card scanner. An airline reservation system can identify an individual and the individual's itinerary. Some other systems, such as x-ray scanners and metal detectors, may operate with surveillance devices that could provide different types of identifying information about an individual, which could be used alone or in conjunction with the type of identifying information obtained from a boarding pass, credit card, passport, or itinerary.

An embodiment also receives information about an object associated with the individual. For example, an x-ray baggage scanner can detect a piece of shaped metal, a powder, a liquid, or a gel in the individual's baggage. Suppose that the metallic piece, powder, or gel complies with the legal restrictions for air-travel.

An embodiment constructs a person record with the information about the individual. The person record is sufficient for identifying the individual, the individual's present location, and possible locations to which the individual is likely to traverse within the environment.

The embodiment constructs an object record with the information about the object associated with the individual. The object record is sufficient to identify the object in some manner or by some property, and is associated with the corresponding individual's person record. For example, an object record of a powder might identify the object as having a powdery property, a chemical composition property, a common usage property, and the like.

An embodiment collects the person records and object records of any number of individuals in a similar manner. The embodiment determines whether any two or more individuals are on paths that would intersect at some common location.

If the embodiment finds a common location according to two or more person records, the embodiment further determines a set of combined objects—or combinations—that can be formed using the objects of the corresponding object records. For example, one object record may describe a powder and another object record may describe a gel. The embodiment may determine that ten possible combined objects can be formed by combining the power and the gel, e.g., in different proportions.

An embodiment uses a repository of combined objects to determine a property or characteristic of a possible combined object. One embodiment analyzes the types of objects in the object records to determine a type of a combined object. The repository may be constructed and populated with extensive knowledge base of a variety of complete or partial object that are combinations of various parts. In one embodiment, the repository may be a system that can compute a possible combined object and the associated properties, given a set of parts from the object records.

If the embodiment determines that a possible combined object has a harmful property, the embodiment outputs an indication of suspicion. The indication has a severity level, i.e., a level of suspicion associated therewith. The indication may identify one or more individuals who are likely to intersect at the common location, one or more objects that are likely to form a combination at the common location, the common location, one or more origination locations, or some combination of these and other aspects.

When a combination has a harmful property, an embodiment determines whether the persons associated with the object parts of the combination are somehow related to one another. For example, based on the information in the individuals' person records, one embodiment scours a social media repository to determine whether the individuals are socially related in some manner or by a certain degree of separation. As another example, based on the information in the individuals' person records, another embodiment collects records of communications to and from those individuals to determine whether the individuals have communicated with each other, or are communicating using some entity that relates the individuals with one another.

If the embodiment determines that a possible connection or relation exists between such individuals, the embodiment outputs another indication of suspicion. In one embodiment, the other indication may be an increment in a severity level of suspicion of a previous indication.

When an embodiment determines that related individuals are likely to intersect at a common location and are carrying objects that form a combination with a harmful property, the embodiment further determines whether a related person has communicated something that implies or indicates a harmful intent on the part of one or more of the related individuals. For example, based on the information in the individuals' person records, one embodiment scours a social media repository to determine whether an individual has posted comments that show malice or adverse feelings towards lawfulness or peace. For such analysis of communication data, one embodiment uses Natural Language Processing (NLP).

If the embodiment determines that communication with adverse or harmful intent exists, the embodiment outputs another indication of suspicion. In one embodiment, the other indication may be an increment in a severity level of suspicion of a previous indication. An embodiment can also output supporting evidence with an indication, such as an identified property of a combination, an identified relationship between individuals, a communication of harmful intent between individuals, or some combination of these and other similarly purposed evidentiary content.

A method of an embodiment described herein, when implemented to execute on a device or data processing system, comprises substantial advancement of the functionality of that device or data processing system in securing physical environments through combinatorial analytics. For example, a prior-art method of securing an environment relies upon security checkpoints and pre-configured lists to identify harmful persons. A prior-art method for detecting harmful objects also relies upon what the object is at the moment of inspection rather than what the object can be converted into, such as by combining with some other object associated with some other person, at some other location in the environment. This manner of securing an environment allows circumventing the security measures that are presently used in various environments. An embodiment detects patterns of travels of different individuals and benign objects to determine whether different individuals can come together at some location to assemble those benign objects into a harmful object. An embodiment further determines whether the individuals coming together at some location have any overt or covert relationships, e.g., via social media or telecommunications. An embodiment further determines if related individuals have expressed any harmful intent in their communications. Such a manner of securing an environment is unavailable in presently available devices or data processing systems. Thus, a substantial advancement of such devices or data processing systems by executing a method of an embodiment is in improving the security of physical environments.

The illustrative embodiments are described with respect to certain equipment, scanners, sources of travel information and identifying information, records, types of objects, repositories, types of data and their collection methods, analyses, indications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
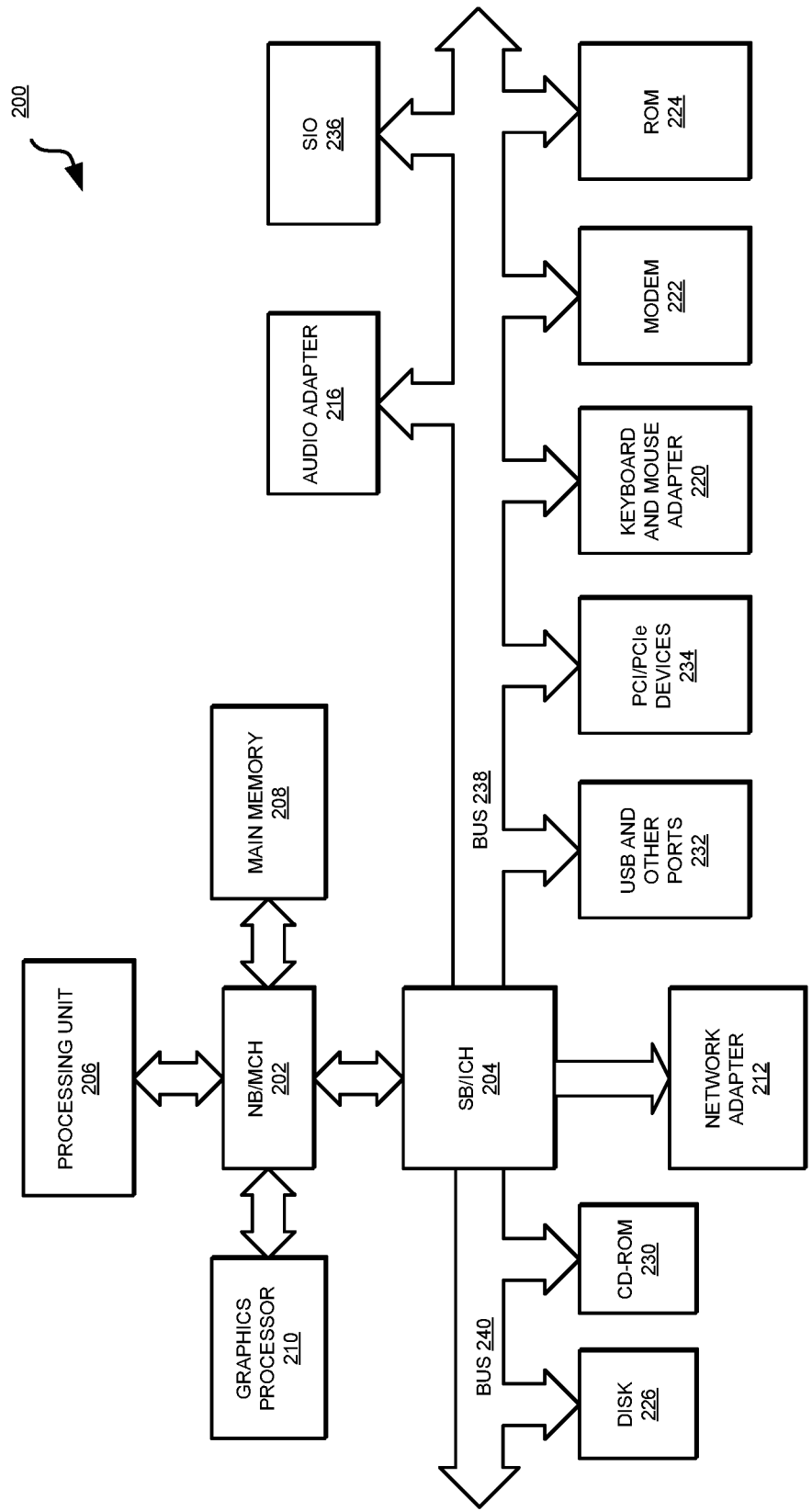
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein, and executes in server 104, which may be a part of a system for securing a physical environment. Scanning application 115 may be a part of application 105 or a separate application operating in conjunction with application 105. Scanning application 115 collects information about individuals and their associated objects as described according to an embodiment. Data collection engine 107 collects relationship data, communication data, or some combination thereof, according to an embodiment described herein. NLP engine 109 analyzes data that is collected in natural language form, such as textual or audio data. Combinations data 111 functions as a repository of information about possible combinations and their properties, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105 and 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
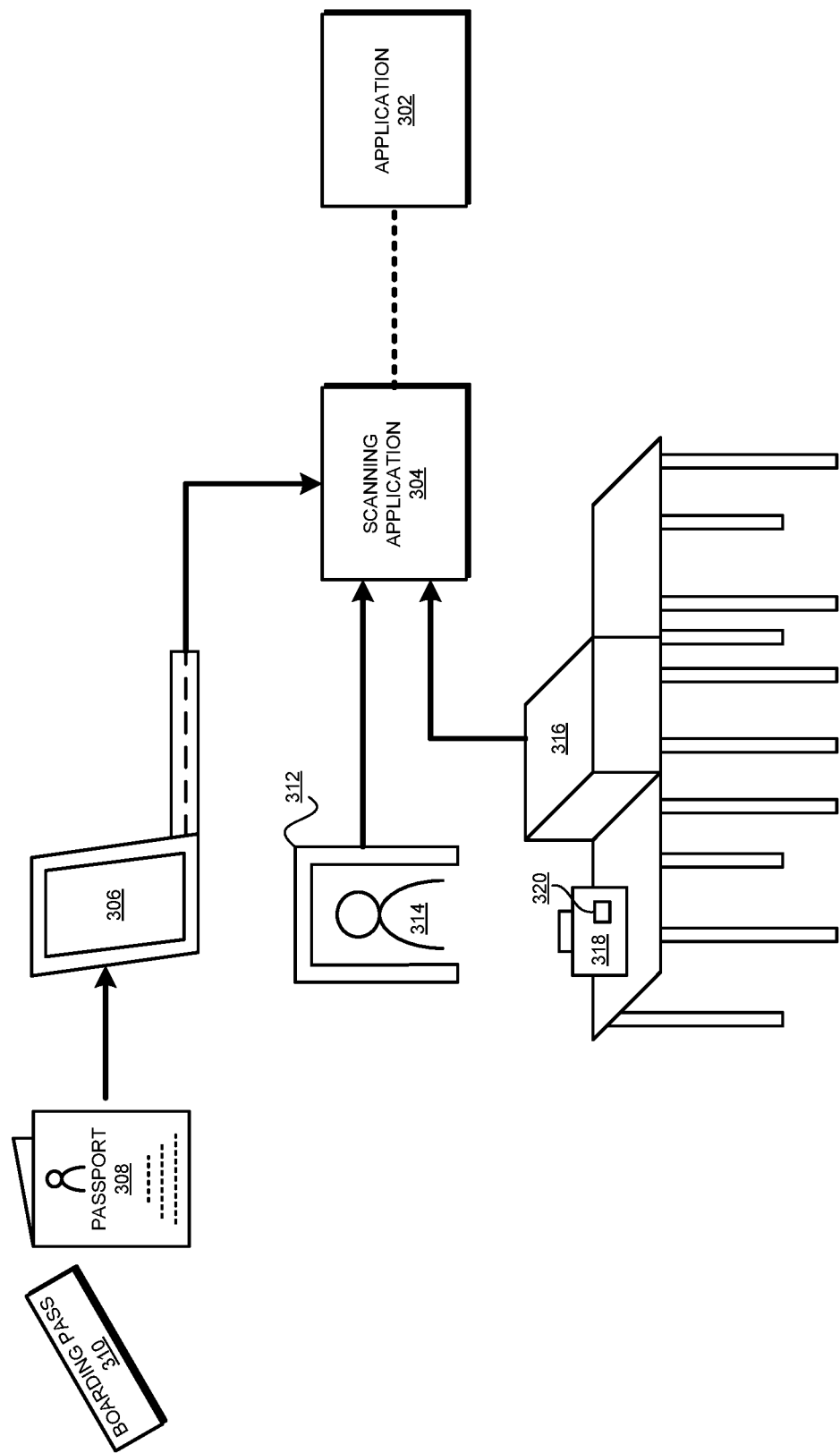
FIG. 3 depicts a block diagram of an example configuration for securing physical environments through combinatorial analytics in accordance with an illustrative embodiment.

With reference to FIG. 3, this figure depicts a block diagram of an example configuration for securing physical environments through combinatorial analytics in accordance with an illustrative embodiment. Application 302 is an example of application 105 in FIG. 1. Scanning application 304 is a part of application 302 to implement a function of an embodiment, or a separate application to implement the function of the embodiment.

Some non-limiting example sources of information are depicted. For example, terminal 306 may be a computer, a kiosk, a scanner, a reader, or other similarly purposed equipment to collect identifying information from a person or personal document. For example, terminal 306 may collect identifying information about an individual from passport 308 or boarding pass 310, a credit card, or any suitable document or instrument capable of providing similar information.

As another example, device 312 may be a scanner that scans a person's body. Device 312 may be able to collect information or supplemental information to identify a person, such as person 314.

Scanner 316 is equipment usable to detect an object associated with person 314. In the depicted example, scanner 316 scans baggage 318 belonging to person 314. Baggage 318 contains object 320, which is detected by scanner 316.

Equipment 306, 312, 316, and other suitable equipment operating in this manner, collect information identifying person 314, object 320, or both. Equipment 306, 312, and 316 supply the collected information about person 314 and object 320 as inputs to scanning application 304. Scanning application 304 creates a person record and an object record, as described herein. Scanning application 304 provides the person record and the object record to application 302 as input.

Figure 4:
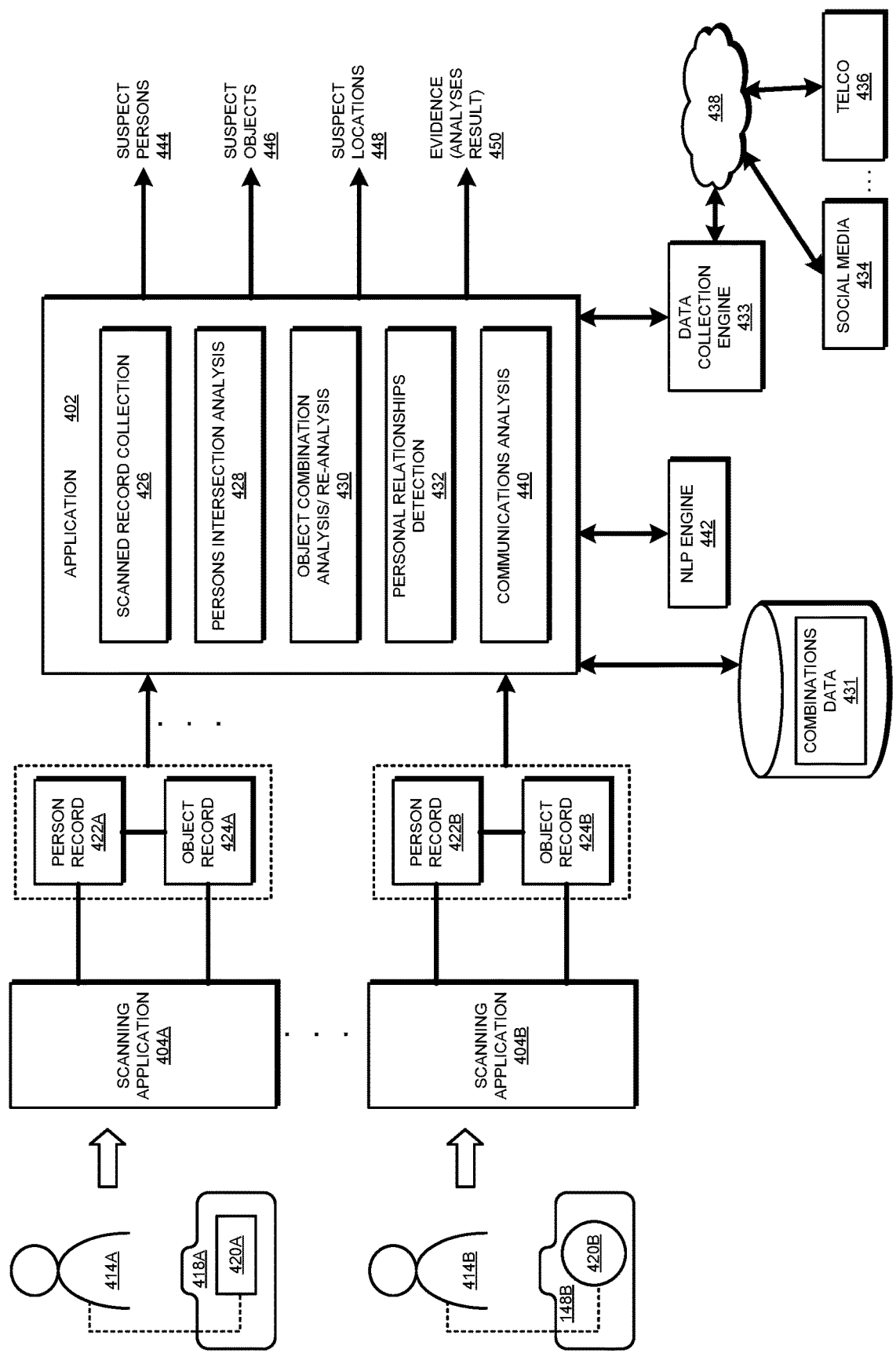
FIG. 4 depicts a block diagram of a configuration for securing physical environments through combinatorial analytics in accordance with an illustrative embodiment.

With reference to FIG. 4, this figure depicts a block diagram of a configuration for securing physical environments through combinatorial analytics in accordance with an illustrative embodiment. Application 402 is an example of application 302 in FIG. 3. Scanning applications 404A and 404B are each an example of scanning application 304 in FIG. 3.

Assume that scanning applications 404A and 404B operate with equipment at different locations in a given environment. For example, in the civil aviation physical environment described earlier, assume that scanning application 404A operates with terminal 306 and scanner 316 in Seattle airport, and scanning application 404B operates with terminal 306, device 312, and scanner 316 in Los Angeles airport.

Person 414A arrives at Seattle airport and presents a passport to identify himself. Person 414A has baggage 418A, which contains object 420A. Object 420A is compliant with a legal requirement for objects that can be carried on an airliner. Scanning application 404A creates person record 422A to identify person 414A and his travel plans. Scanning application 404A creates object record 424A to identify object 420A and one or more properties of object 420A.

Person 414B arrives at Los Angeles airport and presents a passport to identify himself. Person 414B has baggage 418B, which contains object 420B. Object 420B is compliant with a legal requirement for objects that can be carried on an airliner. Scanning application 404B creates person record 422B to identify person 414B and his travel plans. Scanning application 404B creates object record 424B to identify object 420B and one or more properties of object 420B.

Any number of person records and object records can be created in this manner. Scanning applications 404A-B supply person records 422A-B and object records 424A-B as inputs to application 402.

Component 426 receives the person records and object records from as many scanning applications as may be operating in a given environment, for as many person-object pairs as may be scanned. Note that a person can have any number of objects associated with the person. Therefore, a person record can have any number of object records associated therewith without limitation.

Component 428 performs a persons intersection analysis. Particularly, component 428 examines person records 422A and 422B to determine, according to their itineraries, whether persons 414A and 414B will be at a common location in the environment at any given time.

If persons 414A and 414B will be at a common location, component 430 analyzes object records 424A and 424B to determine whether objects 420A and 420B can be combined to produce a combination with any harmful properties. For example, component 430 uses repository 431 of combinations data for this analysis.

In some cases, object record 424A may identify some properties of object 420A without the context of object 420B. When component 430 analyzes object records 424A and 424B, component 430 may re-analyze object 420A to identify some additional properties of object 420A given the context of its combinability with object 420B.

If component 430 finds that a combination of objects 420A and 420B has a harmful property, component 432 determines whether persons 414A and 414B have any relationship between them. For example, component 432 invokes data collection engine 433. Data collection engine 433 accesses one or more sources 434-436 over network

438. As an example, data source 434 may be a social media server and data source 436 may be a telecommunication services provider's server.

If component 432 finds a relationship between persons 414A and 414B, component 440 further analyzes the communications that may have occurred between persons 414A, 414B, other persons (not shown), or some combination thereof. For example, component 440 uses the data collected by data collection engine 433 to extract such communications. Component 440 then uses NLP engine 442 to determine whether such communications include or imply any harmful intentions on the part of person 414A, person 414B, or both.

Depending upon the findings of components 430, 432, and 440, application 402 outputs one or more indications. For example, one example indication may be an indication of suspect person(s) 444, whereby application 402 indicates whether person 414A, person 414B, or both are suspected of having a potential for performing harmful acts. Indication 444 may have a level of suspicion associated therewith.

Another example indication may be an indication of suspect object(s) 446, whereby application 402 indicates whether object 420A, object 420B, or both are suspected of having a potential to form a harmful combination. Indication 446 may have a level of suspicion associated therewith. In some cases, indications 444 and 446 and their levels of suspicions may be combined in a suitable manner to form a combined indication and level of suspicion.

Another example indication may be an indication of suspect location(s) 448, whereby application 402 indicates where persons 414A and 414B are likely to intersect and where the harmful combination of object 420A and object 420B may form the harmful combination. Indication 448 may have a level of suspicion associated therewith. In some cases, indications 444, 446, and 448 and their levels of suspicions may be combined in a suitable manner to form a combined indication and level of suspicion.

Optionally, application 402 may also output evidence 450 in support of one or more of indications 444-448. For example, indication 444 may be supported by outputting the result of intersection analysis by component 428 as evidence 450. Other indications may be supported by suitable results from the operation of other components as described herein.

Figure 5:
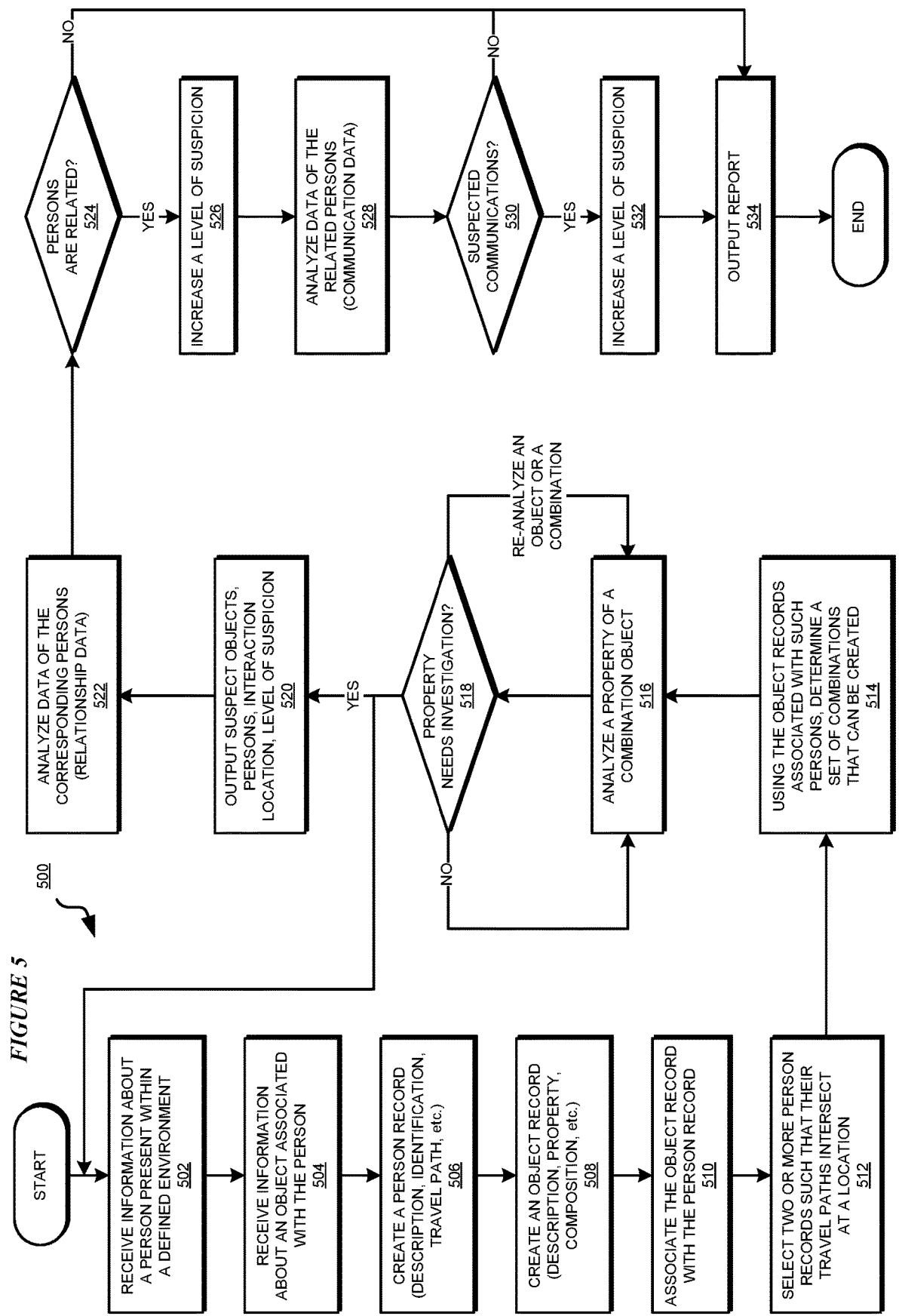
FIG. 5 depicts a flowchart of an example process for securing physical environments through combinatorial analytics in accordance with an illustrative embodiment.

With reference to FIG. 5, this figure depicts a flowchart of an example process for securing physical environments through combinatorial analytics in accordance with an illustrative embodiment. Process 500 can be implemented in application 402 in FIG. 4.

The application receives information about a person's presence in a physical environment (block 502). The application receives information about an object associated with the person in the environment (block 504).

The application creates a person record corresponding to the person (block 506). The person record includes identifying information or description of the person, information about a path of travel of the person, and other additional or different similarly purposed information.

The application creates an object record corresponding to the object (block 508). The object record includes a description of the object, one or more properties of the object—such as a composition or use of the object, and other additional or different similarly purposed information.

The application associates the object record with the person record (block 510). The application selects two or more person records such that the travel paths described therein intersect at some location (block 512). Using the object records associated with such person records, the application computes or determines a set of combinations that can be created from the objects in the object records (block 514).

The application analyzes a property of a combination from the set (block 516). The application determines whether the analyzed property of the combination needs to be investigated, e.g., when the property is deemed potentially harmful in the environment (block 518). If the property or the combination needs to be investigated, such as by security personnel or another system ("Yes" path of block 518), the application outputs the suspect objects from the object records, the combination, the analyzed property, the persons from the person records, the intersection location, a level of suspicion, or some combination thereof (block 520). The level of suspicion can be ascertained in any suitable manner, including but not limited to by using designated levels of severity with certain designated harmful properties in a list.

If the property or the combination need not be investigated ("No" path of block 518), the application returns to block 516 to analyze another property of the combination or a property of another combination. In some cases, an object, an object's property in an object record, a combination, a combination's property, or some combination thereof, may have to be reanalyzed as described herein ("re-analyze" path of block 518). In such cases, the application returns to block 516 where such re-analysis is performed.

If no harmful properties were detected that needed investigation or action at block 518, the application returns to block 502 to continue the detection process with other persons and/or objects.

If any harmful properties were detected, the application proceeds to block 520 and onwards to block 522. The application analyzes the data of the persons corresponding to the output of block 520 (block 522). For example, the application analyzes the relationship data from social media to determine whether the persons who contribute objects to the harmful combination have any relationship with one another (block 524).

If the persons are related ("Yes" path of block 524), the application increases the level of suspicion generated at block 520 (block 526). If the persons are not related, the application proceeds to block 534.

The application further analyzes the communication data of the related persons (block 528). The application determines whether the related persons communicated any harmful intentions in their communications (block 530). If the persons have had communications that are suspect for including harmful intentions ("Yes" path of block 530), the application increases the level of suspicion generated at block 520 (block 532).

The application outputs a report (block 534). The application ends process 500 thereafter. The report of block 534 can include the identity of the persons, the description of the objects, the properties of the objects, the harmful combination that is likely, the harmful properties of the combination, the location where the persons intersect, the relationship between the persons, any harmful communications made by the persons, or some combination thereof. The order of checks described in FIG. 5 are not intended to be limiting. These checks or similar checks can be arranged in a different order according to the needs of a particular circumstance, and such rearrangements are contemplated within the scope of the illustrative embodiments.

Thus, a computer implemented method, system or apparatus, and computer program product are provided in the illustrative embodiments for securing physical environments through combinatorial analytics. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for securing a physical environment, the method comprising:

performing an intersection determination using a first record of a first person and a second record of a second person, to determine whether a travel plan of the first person and a travel plan of the second person intersect at a location and a time;

analyzing, responsive to the intersection determination being affirmative, whether a first physical object associated with the first person and a second physical object associated with the second person, the second person and second physical object being different from the first person and first physical object respectively, are combinable to form a combined physical object having a combined property;

identifying a likelihood of a harmful intention by performing natural language analysis on communication data between the first person and the second person to determine whether the communication data is indicative of a likelihood of the first person with the first physical object and the second person intersecting with the second physical object to form a harmful combination;

the identifying further including determining, using a repository of combined objects that describes combinations of physical objects, whether the combined property is designated as harmful in the physical environment, wherein the repository of combined objects comprises a set of combined objects, each combined object in the set of combined objects having a set of combined properties, and wherein the combined object is a member of the set of combined objects and outputting, responsive to the combined property being designated as harmful in the physical environment and the likelihood of the harmful intent exceeding a threshold, a suspicion indication wherein the suspicion indication includes an identity of the first person, an identity of the second person, and a level of suspicion.

2. The method of claim 1, further comprising:

analyzing, responsive to the combined property being designated as harmful in the physical environment, a relationship data to determine whether a relationship exists between the first person and the second person; and increasing, responsive to the relationship existing between the first person and the second person, the level of suspicion.

3. The method of claim 2, further comprising:

accessing a social media repository to obtain social media relationship data, wherein the social media relationship data forms the relationship data.

4. The method of claim 1, further comprising:

analyzing, responsive to the combined property being designated as harmful in the physical environment, the communication data to determine whether a communication links the first person and the second person; and increasing, responsive to the communication linking the first person and the second person, the level of suspicion.

5. The method of claim 4, further comprising:

accessing a telecommunications service repository to obtain telecommunications data, wherein the telecommunications data forms the communication data, and wherein the first person is linked to the second person by reasons of their communications with another entity.

6. The method of claim 1, wherein the suspicion indication further includes a description of the first physical object and a description of the second physical object.

7. The method of claim 1, wherein the level of suspicion corresponds to a level of harmfulness of the combined physical object.

8. The method of claim 1, further comprising:

concluding that the first physical object and the second physical object are combinable in different combinations, each combination forming a different combined object in a set of combined objects, each different combined object having a different combined property, wherein a first combined property of a first combined object is not designated as harmful, and wherein a second combined property of a second combined object is designated as harmful;

selecting the second combined object as the combined physical object; and selecting the second combined property as the combined property.

9. The method of claim 1, further comprising:

detecting a presence of the first person at a first location in the physical environment, the first person associated with the first physical object;

forming the first record corresponding to the first person, the first record including an identifier of the first person and the travel plan of the first person;

forming a first object record corresponding to the first physical object, the first object record comprising a property of the first physical object, wherein the first physical object satisfies a requirement for legal presence in the physical environment;

detecting a presence of the second person at a second location in the physical environment, the second person being associated with the second physical object;

forming a second record corresponding to the second person, the second record including an identifier of the second person and the travel plan of the second person; and forming a second object record corresponding to the second physical object, the second object record comprising a property of the second physical object, wherein the second physical object satisfies the requirement for legal presence in the physical environment.

10. The method of claim 9, further comprising identifying a likelihood of a harmful intention by performing natural language analysis on communication data between the first person and the second person to determine whether the communication data is indicative of a likelihood of one of the first person and the second person performing a harmful act.

11. The method of claim 9, further comprising identifying a likelihood of a harmful intention by performing natural language analysis on communication data between the first person and the second person to determine whether the communication data is indicative of a likelihood of the first physical object and the second physical object forming a harmful combination.

12. The method of claim 1, wherein the method is embodied in a computer-program product comprising one or more computer-readable storage devices and computer-readable program instructions which are stored on the one or more computer-readable storage devices and executed by one or more processors.

13. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

14. A computer program product for securing a physical environment, the computer program product comprising one or more computer-readable storage devices, and program instructions stored on at least one of the one or more storage devices, the stored program instructions comprising:
   program instructions to perform an intersection determination using a first record of a first person and a second record of a second person, to determine whether a travel plan of the first person and a travel plan of the second person intersect at a location and a time;
   program instructions to analyze, responsive to the intersection determination being affirmative, whether a first physical object associated with the first person and a second physical object associated with the second person, the second person and second physical object being different from the first person and first physical object respectively, are combinable to form a combined physical object having a combined property;
   program instructions to identify a likelihood of a harmful intention by performing natural language analysis on communication data between the first person and the second person to determine whether the communication data is indicative of a likelihood of the first person with the first physical object and the second person intersecting with the second physical object to form a harmful combination;
   program instructions to determine, using a repository of combined objects that describes combinations of physical objects, whether the combined property is designated as harmful in the physical environment, wherein the repository of combined objects comprises a set of combined objects, each combined object in the set of combined objects having a set of combined properties, and wherein the combined object is a member of the set of combined objects and
   program instructions to output, responsive to the combined property being designated as harmful in the physical environment and the likelihood of the harmful intent exceeding a threshold, a suspicion indication wherein the suspicion indication includes an identity of the first person, an identity of the second person, and a level of suspicion.

15. The computer program product of claim 14, further comprising:
   program instructions to analyze, responsive to the combined property being designated as harmful in the physical environment, a relationship data to determine whether a relationship exists between the first person and the second person; and
   program instructions to increase, responsive to the relationship existing between the first person and the second person, the level of suspicion.

16. The computer program product of claim 15, further comprising:
   program instructions to access a social media repository to obtain social media relationship data, wherein the social media relationship data forms the relationship data.

17. The computer program product of claim 14, further comprising:
   program instructions to analyze, responsive to the combined property being designated as harmful in the physical environment, the communication data to determine whether a communication links the first person and the second person; and
   program instructions to increase, responsive to the communication linking the first person and the second person, the level of suspicion.

18. The computer program product of claim 17, further comprising:
   program instructions to access a telecommunications service repository to obtain telecommunications data, wherein the telecommunications data forms the communication data, and wherein the first person is linked to the second person by reasons of their communications with another entity.

19. A computer system for securing a physical environment, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to perform an intersection determination using a first record of a first person and a second record of a second person, to determine whether a travel plan of the first person and a travel plan of the second person intersect at a location and a time;
   program instructions to analyze, responsive to the intersection determination being affirmative, whether a first physical object associated with the first person and a second physical object associated with the second person, the second person and second physical object being different from the first person and first physical object respectively, are combinable to form a combined physical object having a combined property;
   program instructions to identify a likelihood of a harmful intention by performing natural language analysis on communication data between the first person and the second person to determine whether the communication data is indicative of a likelihood of the first person with the first physical object and the second person intersecting with the second physical object to form a harmful combination;
   program instructions to determine, using a repository of combined objects that describes combinations of physical objects, whether the combined property is designated as harmful in the physical environment, wherein the repository of combined objects comprises a set of combined objects, each combined object in the set of combined objects having a set of combined properties, and wherein the combined object is a member of the set of combined objects and
   program instructions to output, responsive to the combined property being designated as harmful in the physical environment and the likelihood of the harmful intent exceeding a threshold, a suspicion indication wherein the suspicion indication includes an identity of the first person, an identity of the second person, and a level of suspicion.

\* \* \* \* \*